W. M. WALKER.
Plow.
9142X
Patented Oct. 6, 1835.
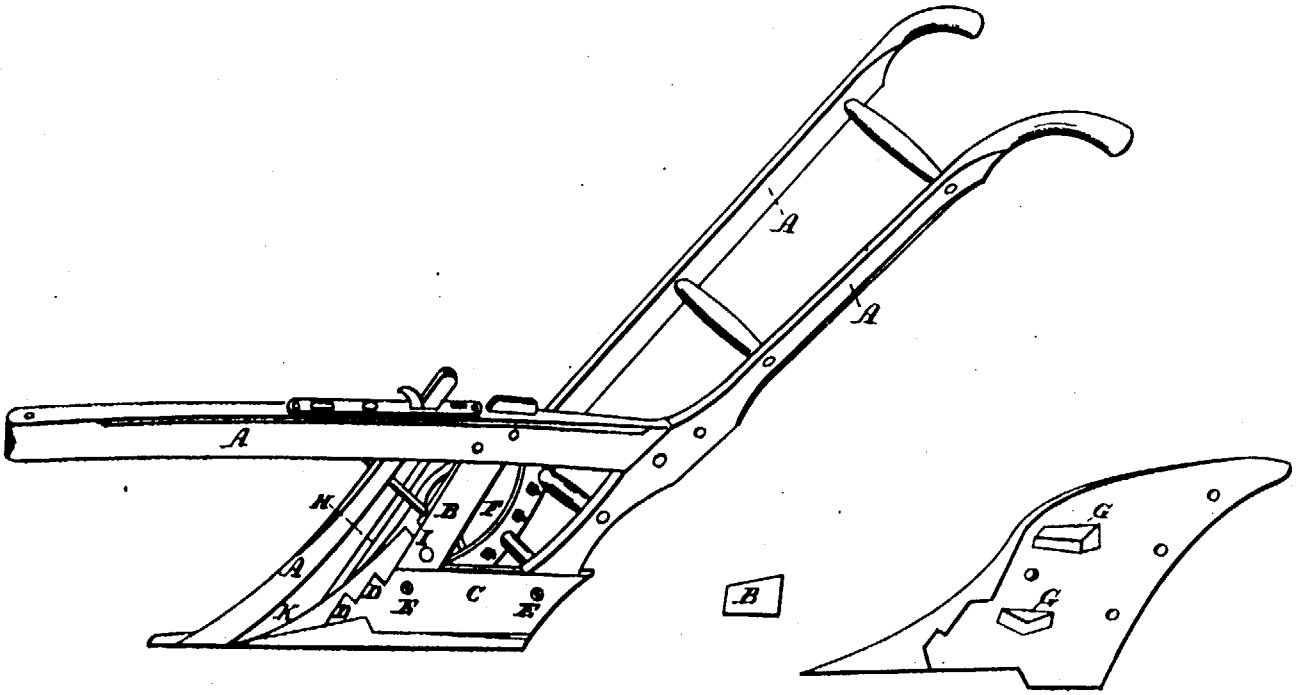

UNITED STATES PATENT OFFICE.

WILLIAM WALKER, OF WASHINGTONVILLE, PENNSYLVANIA.

IMPROVEMENT IN PLOWS.

Specification forming part of Letters Patent dated October 6, 1835.

*To all whom it may concern:*

Be it known that I, WILLIAM WALKER, of Washingtonville, Columbia county, State of Pennsylvania, have made an Improvement in Plows, which is described as follows, reference being had to the annexed drawing of the same, making a part of this specification.

A A A represent the handles, beam, and colter, made in the usual manner; B, the sheth or standard, made of suitable timber, square in front, behind, and on the land side, and beveled on the side next the mold-board, and framed into the beam in the usual manner; C, the landside, made of cast-iron, having two projections, D D, in front, fitting into corresponding depressions or notches in the mold-board, and secured to the sheth and handle by screw-bolts E E; F, the mold-board, made of cast-iron, and shaped so as to fit the straight sheth and take land, having two projections, G G, the upper one projecting farther toward the landside than the lower one in order to throw the sheth in an inclining position—about two and one-half inches from a perpendicular line.

The mold-board is secured to the sheth by two screw-bolts and nuts, H I, passing through it and the mold-board; K, the share, made of wrought iron in the usual manner, and fastened to the mold-board by screws with nuts.

What I claim as my invention, and desire to secure by Letters Patent, is—

The peculiar formation of the sheth or standard and the projections on the inner sides of the mold-board, which give the sheth or standard a leaning position and cause the plow to take land as above described.

WILLIAM WALKER.

Witnesses:

WM. P. ELLIOT,
ASAHEL BACON.